(12) United States Patent
Tanigawa et al.

(10) Patent No.: US 8,113,457 B2
(45) Date of Patent: Feb. 14, 2012

(54) FILAMENT WINDING APPARATUS

(75) Inventors: Motohiro Tanigawa, Kyoto (JP);
Tadashi Uozumi, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 426 days.

(21) Appl. No.: 12/491,725

(22) Filed: Jun. 25, 2009

(65) Prior Publication Data

US 2010/0032510 A1    Feb. 11, 2010

(30) Foreign Application Priority Data

Aug. 5, 2008  (JP) .................. 2008-202197

(51) Int. Cl.
*B65H 54/64* (2006.01)

(52) U.S. Cl. .................. 242/438; 242/439.2; 242/439.6; 242/441.4

(58) Field of Classification Search .................. 242/438, 242/438.1, 439.2, 439.6, 441.4, 444.4
See application file for complete search history.

(56) References Cited

U.S. PATENT DOCUMENTS

| | | | | |
|---|---|---|---|---|
| 7,815,141 B2 * | 10/2010 | Uozumi et al. | ............ | 242/445.1 |
| 2009/0038759 A1 | 2/2009 | Uozumi et al. | | |
| 2009/0065622 A1 | 3/2009 | Uozumi et al. | | |
| 2009/0126875 A1 | 5/2009 | Uozumi et al. | | |
| 2009/0127373 A1 | 5/2009 | Uozumi et al. | | |

FOREIGN PATENT DOCUMENTS

| | | |
|---|---|---|
| EP | 0036447 A1 | 9/1981 |
| EP | 2033766 A1 | 3/2009 |
| EP | 2033767 A2 | 3/2009 |
| EP | 2060384 A1 | 5/2009 |
| EP | 2060385 A2 | 5/2009 |
| JP | 05-254027 | 10/1993 |
| JP | 2000108212 A | 4/2000 |
| JP | 2004-148776 | 5/2004 |
| WO | 2008139881 A1 | 11/2008 |

OTHER PUBLICATIONS

European search report for corresponding European application 09163437.8 lists the references above.

* cited by examiner

*Primary Examiner* — Emmanu M Marcelo
(74) *Attorney, Agent, or Firm* — DLA Piper LLP (US)

(57) ABSTRACT

A filament winding apparatus reduces fluctuations in a winding operation by bringing a plurality of guide portions that guide fiber bundles to a liner close to the liner in a winding unit. Each of the guide portions is a tubular member having a guide hole penetrated from a base end to a leading end portion. The leading end portion has a smaller thickness width. Each of the guide portions guides a second fiber bundle to the liner by passing the second fiber bundle from a side of the base end portion to a side of the leading end portion of the guide hole. By rotating each of the guide portions about an axis of the guide portion, and by sliding the guide portions in the radius direction of the liner, the guide portions can be brought close to the liner.

10 Claims, 6 Drawing Sheets

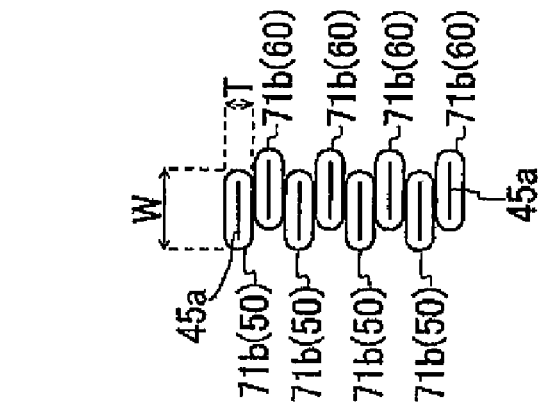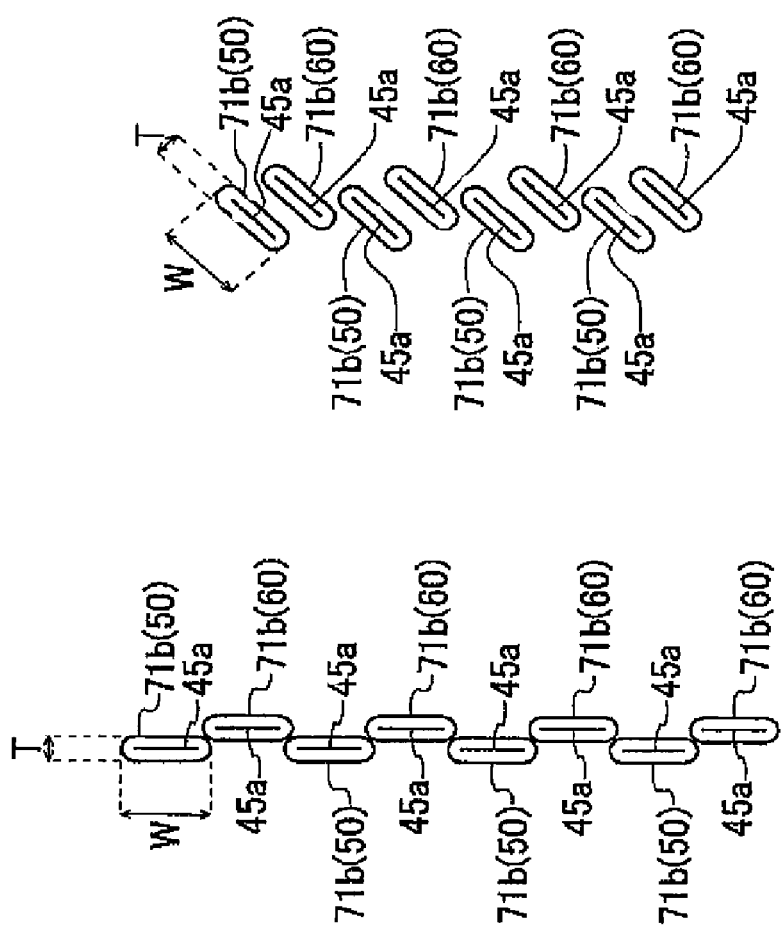

FILAMENT WINDING APPARATUS

CROSS-REFERENCE TO RELATED APPLICATIONS

This application claims the benefit of priority under 35 USC 119 of Japanese application no. 2008-202197, filed on Aug. 5, 2008, which is incorporated herein by reference.

BACKGROUND OF THE INVENTION

1. Field of the Invention

The present invention relates to a filament winding apparatus.

2. Description of the Related Art

A well-known filament winding apparatus includes a hoop winding unit and a helical winding unit and forms reinforced layers by alternately performing a hoop winding operation by the hoop winding unit and a helical winding operation by the helical winding unit repeatedly on a liner and thus winding fiber bundles around the liner.

When the helical winding unit performs the helical winding operation, the liner moves in an axial direction while being rotated at constant speed, and the fiber bundle is supplied from the helical winding unit and wound around the liner. In a conventional art, when the fiber bundle is wound around the liner, the fiber bundle is guided from a guide portion of the helical winding unit to the liner (for example, refer to JP 2000-108212A).

However, some liners have a smaller radius at both end portions than at a central portion. When the fiber bundle is wound around such liners, a distance from the liner to the guide portion varies between the case of winding the fiber bundle around the end portions and the case of winding the fiber bundle around the central portion. When the distance from the liner to the guide portion varies, a tension of the fiber bundle fluctuates, resulting in fluctuations in the winding operation, i.e., an amount of wound fiber bundle varies depending on a position of the liner.

In view of the above, an apparatus has been developed that reduces the fluctuations in the winding operation by approximating the guide portion in a radius direction of the liner and by resultantly reducing the variation (an amount of change) of the distance between the liner and the guide portion when the portion to have the fiber bundle wound around changes from the central portion to the end portions of the liner.

However, a plurality of guide portions are usually provided around the liner. As a result, leading end portions of the guide portions collide and interfere with each other when the guide portions are moved in the radius direction of the liner to be close to the liner, and therefore, there are limitations to the reduction of the variation of the distance from the liner to the guide portions.

SUMMARY OF THE INVENTION

In order to overcome the problems described above, the present invention provides a filament winding apparatus that reduces fluctuations in a winding operation by reducing the variation of a distance from a liner to a plurality of guide portions.

The problems to be overcome by the present invention have been described, and a method of solving the problems will be described below.

According to an embodiment of the present invention, a filament winding apparatus includes a plurality of guide portions that are tubular members each having a guide hole penetrated from a base end portion to a leading end portion. The leading end portion has a smaller size in a thickness direction than in a width direction. Each of the guide portions guides a fiber bundle to a liner by passing the fiber bundle from a side of the base end portion to a side of the leading end portion of the guide hole. The filament winding apparatus rotates the guide portions about their respective axes and also brings the guide portions close to the liner by moving the guide portions in a radius direction of the liner.

According to an embodiment of the present invention, the filament winding apparatus includes: a first supporting member that supports the guide portion such that the guide portion can rotate about its axis; a second supporting member that supports the first supporting member such that the first supporting member can slide in the radius direction of the liner; a rotation mechanism that rotates the guide portion about its axis; and a slide mechanism that slides the first supporting member in the radius direction of the liner.

The filament winding apparatus according to an embodiment of the present invention includes a phase change mechanism that divides the guide portions into a plurality of groups and changes phases around an axis of the liner with respect to each group.

In the filament winding apparatus according to an embodiment of the present invention, the first supporting member slides with respect to the second supporting member such that a distance from the leading end portion of the guide portion to the liner is maintained constant.

In the filament winding apparatus according to an embodiment of the present invention, by bringing the guide portions close to the liner while rotating the leading end portions of the guide portions about their respective axes, the guide portions can be brought close to the liner until the leading end portions of the guide portions overlap in the thickness direction. Accordingly, variation of the distance between the liner and each of the guide portions is reduced, thereby reducing fluctuations in a winding operation.

In the filament winding apparatus according to an embodiment of the present invention, by rotating the guide portions about their respective axes by the rotation mechanism, and by sliding the first supporting members, i.e., by sliding the guide portions in the radius direction of the liner by the slide mechanism, the guide portions can be brought close to the liner until the leading end portions of the guide portions overlap in the thickness direction. Accordingly, variation of the distance between the liner and each of the guide portions is reduced, thereby reducing fluctuations in a winding operation.

In the filament winding apparatus according to an embodiment of the present invention, by bringing the guide portions close to the liner while rotating the leading end portions of the guide portions about their respective axes, and by changing the phases around the axis of the liner with respect to each of the plurality of groups by the phase change mechanism, the guide portions can be brought close to the liner until the leading end portions of the guide portions overlap in the thickness direction, and the fiber bundles guided from the guide portions of the plurality of groups can be wound around the liner. Accordingly, variation of the distance between the liner and each of the guide portions is further reduced, fluctuations in the winding operation are also reduced, and a greater number of fiber bundles can be wound around the liner.

In the filament winding apparatus according to an embodiment of the present invention, since the distance from each of the leading end portions of the guide portions to the liner is maintained constant, the fiber bundles can be wound around the liner while maintaining a constant tension, and fluctuations in the winding operation are reduced.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIGS. 6A, 6B, and 6C are enlarged views of leading end portions of the guide portions of the first and second guide members according to an embodiment of the present invention.

DETAILED DESCRIPTION OF PREFERRED EMBODIMENTS

A filament winding apparatus 1 according to an embodiment of the present invention will now be described.

Figure 1:
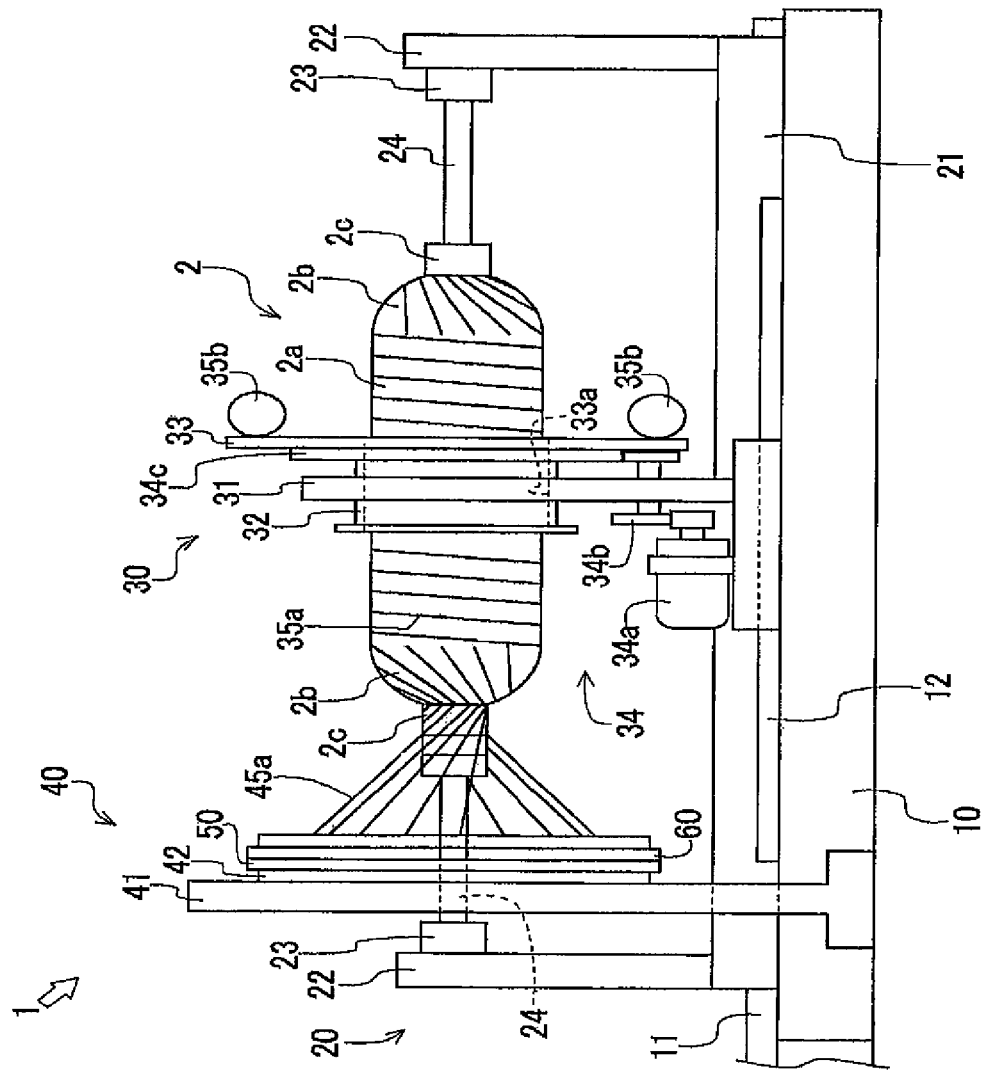
FIG. 1 is an elevation view of a filament winding apparatus according to an embodiment of the present invention.

As illustrated in FIG. 1, the filament winding apparatus 1 winds fiber bundles 35a and 45a around a liner 2 and includes a machine frame 10, a liner supporting unit 20, a hoop winding unit 30, and a helical winding unit 40. The liner 2 integrally includes a first cylindrical portion 2a having a constant radius, hemisphere portions 2b, 2b provided at both ends of the first cylindrical portion 2a, and second cylindrical portions 2c, 2c provided at end portions of the hemisphere portions 2b, 2b. The radius of the liner 2 continuously changes from the first cylindrical portion 2a to each of the hemisphere portions 2b and to each of the second cylindrical portions 2c. The radius of the second cylindrical portions 2c is smaller than that of the first cylindrical portion 2a. The liner 2 is composed of a metal container made of high-strength aluminum or stainless steel etc. or a plastic container made of polyamide resin etc., for example. The fiber bundle is composed of glass fiber, carbon fiber or the like.

The machine frame 10 is a primal structure of the filament winding apparatus 1 and includes first rails 11, 11 that guide the liner 2 and second rails 12, 12 that guide the hoop winding unit 30. The first rails 11, 11 extend in one direction, and the second rails 12, 12 extend in the same direction as the first rails 11, 11.

The liner supporting unit 20 includes a base 21 that is provided as a primal structure of the liner supporting unit 20 to support the liner 2, supporting boards 22, 22 that are individually fixed to the base 21 to sandwich the liner 2 therebetween, chucks 23, 23 that are attached to the respective supporting boards 22, 22, and shaft portions 24, 24 each having one end attached to the corresponding chuck 23 and the other end attached to the corresponding second cylindrical portion 2c, which is an end portion of the liner 2.

The base 21 is arranged on the first rails 11, 11 and slidably reciprocated on the first rails 11, 11 by a first drive unit composed of a motor and a pneumatic or hydraulic cylinder, for example. The liner 2 is moved along with the base 21, in other words, the liner 2 is moved in an axial direction of the liner 2.

The chuck 23 is rotatively driven by a second drive unit composed of a motor, etc. A rotary drive force generated by the second drive unit is transmitted to the liner 2 via the chuck 23 and the shaft portion 24 to rotate the liner 2 about its axis.

The hoop winding unit 30 performs a hoop winding operation, in which the fiber bundle is wound in such a manner that a longitudinal direction of the fiber bundle is substantially perpendicular to the axial direction of the liner 2. The hoop winding unit 30 includes: a frame 31 that is a primal structure of the hoop winding unit 30; a cylindrical portion 32 that penetrates through a penetration hole of the frame 31 and relatively rotates with respect to the frame 31; a rotary table 33 that is rotatably supported by the frame 31 by being attached to the cylindrical portion 32; a third drive unit that moves the rotary table 33 along the second rails 12, 12; a fourth drive unit 34 that rotates the rotary table 33; and a first supply unit that supplies the liner 2 with the first fiber bundle 35a.

The frame 31 is arranged on the second rails 12, 12 and reciprocated along the second rails 12, 12 by the third drive unit composed of a motor or a pneumatic or hydraulic cylinder, for example. The rotary table 33 is moved along with the frame 31. The liner 2 is arranged on a trajectory of the rotary table 33 of the time when the table 33 is moved by the third drive unit, and the rotary table 33 has a first hole portion 33a, which is a penetration hole through which the liner 2 penetrates.

The fourth drive unit 34 includes: a motor 34a that is provided as a drive source for rotating the rotary table 33; a motor gear 34b that is connected with the motor 34a; and a table gear 34c that is connected with the motor gear 34b and fixed to the rotary table 33. When the motor 34a is rotated, the rotary table 33 is also rotated.

The first supply unit is provided to the rotary table 33 and includes bobbins 35b around each of which the first fiber bundle 35a is wound, a guide member that is composed of a roller-shaped member etc. and that guides the first fiber bundle wound around the bobbin 35b to the liner 2, and a first resin impregnating unit that injects resin to impregnate the first fiber bundle 35a with resin. Thermosetting synthetic resin (such as epoxy resin) may be used, for example.

When the hoop winding unit 30 performs a hoop winding operation, the first fiber bundle 35a is fed from the bobbin 35b via the guide member and fixed to the liner 2 by adhesive tape or the like. Then, the third drive unit and the fourth drive unit 34 are operated, i.e., the hoop winding unit 30 is operated, and the rotary table 33 is moved along the second rails 12, 12 while being rotated at constant speed. As the liner 2 passes through the first hole portion 33a of the rotary table 33, the first fiber bundle 35a is guided by the guide member and wound around the liner 2. Immediately before the first fiber bundle 35a is wound around the liner 2, the first resin impregnating unit injects resin and impregnates the first fiber bundle 35a with resin. When the liner 2 reciprocates and passes through the first hole portion 33a prescribed number of times, layers of resin-impregnated fiber bundle 35a are formed around the liner 2, and thus the hoop winding operation is completed.

The helical winding unit 40 performs a helical winding operation, in which the fiber bundle is wound such that a longitudinal direction of the fiber bundle is substantially parallel to the axial direction of the liner 2. The helical winding unit 40 includes: a first fixing frame 41 that is a primal structure of the helical winding unit 40; a first supporting ring 42 that is fixed to the first fixing frame 41; a first guide member 50 and a second guide member 60 that guide the second fiber bundle 45a supplied from a fiber bundle supply unit to the liner 2; and a second resin impregnating unit that injects resin and impregnates the second fiber bundle 45a with resin. The first supporting ring 42 has the shape of a disk and includes a concave portion 42a that is concave in the axial direction of the liner 2 (the liner 2 that is placed on the filament winding apparatus 1) (refer to FIG. 2). The first supporting ring 42 is provided on a trajectory of the liner of the time when the liner 2 is moved by the first drive unit, and is provided with a second hole portion, which is a penetration hole, at its central portion through which the liner 2 passes and penetrates.

When the helical winding unit 40 performs the helical winding operation, the second fiber bundle 45a is fed from the fiber bundle supply unit of the helical winding unit 40 via the first and second guide members 50 and 60 and fixed to the liner 2 by adhesive tape or the like. Then, the first and second drive units are operated, i.e., the helical winding unit 40 is operated, and the liner 2 is moved along the first rails 11, 11 while being rotated at constant speed. As the liner 2 passes through the second hole portion of the first supporting ring 42, the second fiber bundle 45a is guided by the first and second guide members 50 and 60 and wound around the liner 2. Immediately before the second fiber bundle 45a is wound around the liner 2, the second resin impregnating unit injects resin and impregnates the second fiber bundle 45a with resin. When the liner 2 reciprocates and passes through the second hole portion prescribed number of times, layers of the resin-impregnated second fiber bundle 45a are formed around the liner 2, and thus the helical winding operation is completed.

After the hoop winding operation by the hoop winding unit 30 and the helical winding operation by the helical winding unit 40 are alternately performed a prescribed number of times, the first fiber bundle 35a and the second fiber bundle 45a both wound around the liner 2 are heated by a resin hardening furnace or the like, the impregnated resin of the first and second fiber bundles 35a and 45a is hardened, and a fiber-reinforced composite material is formed. Thus, a high-pressure tank or the like using the fiber-reinforced composite material is manufactured.

The first guide member 50 of the helical winding unit 40 will now be described.

Figure 2:
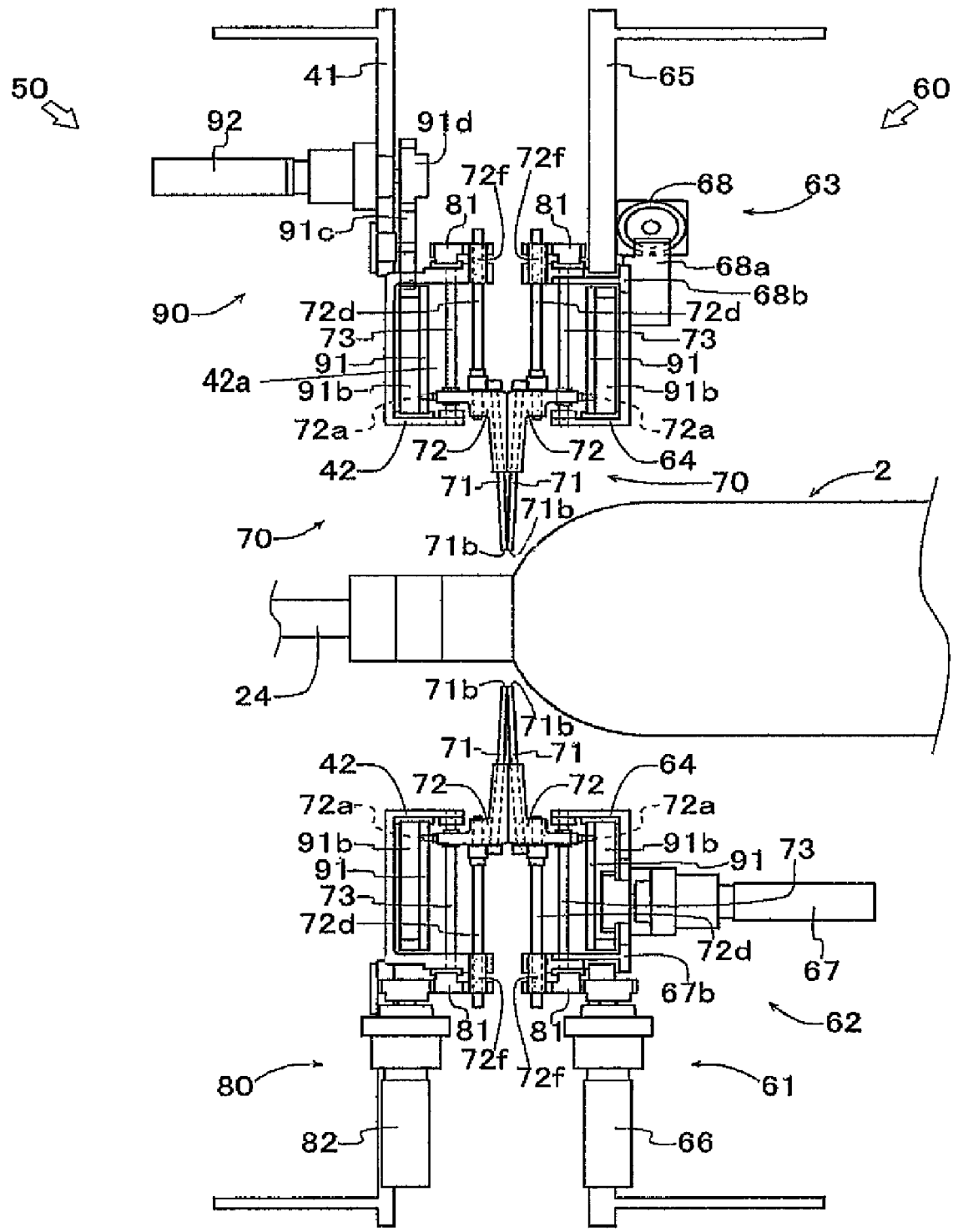
FIG. 2 is an elevation view of first and second guide members according to an embodiment of the present invention.

As illustrated in FIG. 2, the first guide member 50 includes a guide unit 70, a first rotation mechanism 80, and a first slide mechanism 90.

Figure 3:
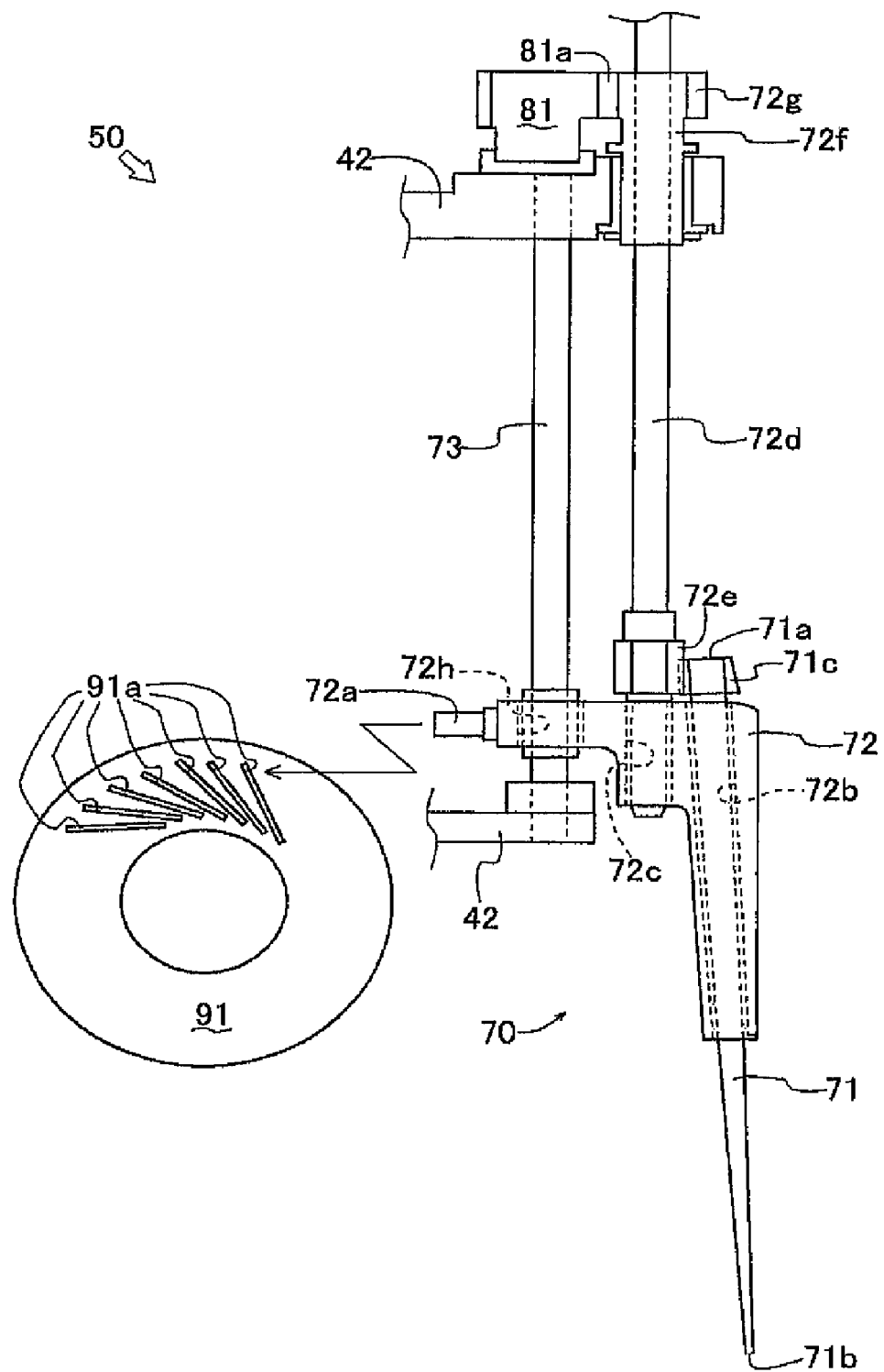
FIG. 3 is an elevation view of a guide unit of the first guide member according to an embodiment of the present invention.

As illustrated in FIGS. 2 and 3, the guide unit 70 is a primal portion of the first guide member 50, which implements a function of guiding the second fiber bundle 45a to the liner 2. The guide unit 70 includes a guide portion 71, a first supporting member 72, and a second supporting member 73.

As illustrated in FIG. 3, the guide portion 71 is a tubular member having a guide hole penetrated from a base end portion 71a to a leading end portion 71b. The guide portion 71 has a taper shape tapered off from a side of the base end portion 71a to a side of the leading end portion 71b and guides the second fiber bundle 45a to the liner 2 by having the second fiber bundle 45a run through the guide hole from the side of the base end portion 71a to the side of the leading end portion 71b. A first gear 71c, which is a bevel gear, is fixed to the base end portion 71a of the guide portion 71.

As illustrated in FIGS. 6A, 6B and 6C, the leading end portion 71b has a flat oval shape, and a size T of a thickness direction is smaller than a size w of a width direction.

The helical winding unit 40 includes a plurality of guide portions 71, which are radially aligned around the liner 2.

As illustrated in FIG. 3, the first supporting member 72 supports the guide portion 71 such that the guide portion 71 can rotate about its axis, and includes a protrusion 72a protruding in the axial direction of the liner 2.

The first supporting member 72 includes a first penetration hole 72b. The first penetration hole 72b penetrates in a direction that is inclined towards the axial direction of the liner 2 with respect to a radius direction of the liner 2.

By being penetrated through the first penetration hole 72b, the guide portion 71 is supported in a state in which the guide portion 71 can rotate about its axis and in which the guide portion 71 extends along the first penetration hole 72b, i.e., in a state in which an axial direction of the guide portion 71 is inclined with respect to the radius direction of the liner 2. The degree of the inclination of the guide portion 71 (that is, the inclination of the first penetration hole 72b) is properly determined in accordance with the quality of material and width of the second fiber bundle 45a, the length of the guide portion 71, and the distance from the guide portion 71 to the liner 2, for example.

The first supporting member 72 includes a second penetration hole 72c that penetrates in the radius direction of the liner 2. A rod-shaped rotary shaft 72d is inserted into the second penetration hole 72c such that the rotary shaft 72d can rotate about its axis and the rotary shaft 72d extends in the radius direction of the liner 2.

A second gear 72e, which is a spur gear, is fixed to the rotary shaft 72d at a position where the second gear 72e engages with the first gear 71c of the guide portion 71. The rotary shaft 72d is inserted into and penetrates through a cylindrical socket 72f, which is connected with the rotary shaft 72d via a spline. Accordingly, the rotary shaft 72d can relatively slide with respect to the socket 72f in the axial direction of the rotary shaft 72d, i.e., in the radius direction of the liner 2, and can rotate about the axis of the rotary shaft 72d along with the socket 72f.

The socket 72f is supported by the first supporting ring 42 such that the socket 72f can rotate about the axis of the rotary shaft 72d, and when the socket 72f is rotated, the rotation of the socket 72f is transmitted to the guide portion 71 via the rotary shaft 72d. First teeth 72g are formed on a circumferential surface of the socket 72f.

The second supporting member 73 is a rod-shaped member that supports the first supporting member 72 such that the first supporting member 72 can slide in the radius direction of the liner 2, and resultantly supports the guide portion 71 such that the guide portion 71 can slide in the radius direction of the liner 2. The second supporting member 73 is fixed to the first supporting ring 42 along the radius direction of the liner 2. The first supporting member 72 includes a third penetration hole 72h that penetrates in the radius direction of the liner 2, and the second supporting member 73 is inserted into the third penetration hole 72h. Thus, the first supporting member 72 can slide in the axial direction of the second supporting member 73, that is, in the radius direction of the liner 2, and the guide portion 71 can resultantly slide.

The helical winding unit 40 includes a plurality of guide units 70 radially aligned around the liner 2. As illustrated in FIG. 2, the first rotation mechanism 80 rotates the guide portions 71 of the guide units 70 about their respective axes and includes a face gear 81 and a fifth drive unit 82.

The face gear 81 has the shape of a disk and includes a penetration hole at its central portion through which the liner 2 is penetrated at the time of helical winding operation. The face gear 81 is externally fitted to the first supporting ring 42 and supported such that the face gear 81 can rotate about the axis of the liner 2.

As illustrated in FIG. 3, the face gear 81 includes second teeth 81a aligned along a circumferential portion of a disk surface thereof. The face gear 81 is arranged at a position where the second teeth 81a engage with the first teeth 72g of the sockets 72f of the guide units 70.

As illustrated in FIG. 2, the fifth drive unit 82 is a drive source that rotates the guide portions 71 about their respective axes and includes a motor etc. The fifth drive unit 82 is connected to the face gear 81 which is rotated by a prescribed angle when the fifth drive unit 82 is operated. When the face gear 81 is rotated by the prescribed angle, rotation of the face gear 81 is transmitted to the guide portions 71 via the sockets 72f and the rotation shafts 72d, and thus the guide portions 71 are concurrently rotated about their respective axes.

The first slide mechanism 90 is a member that slides the guide portions 71 in the radius direction of the liner 2 and includes a grooved cam 91 and a sixth drive unit 92.

As illustrated in FIGS. 2 and 3, the grooved cam 91 has the shape of a disk and includes a penetration hole at its central portion through which the liner 2 passes at the time of helical winding operation. The grooved cam 91 is provided to the concave portion 42a of the first supporting ring 42 and supported such that the grooved cam 91 can rotate about the axis of the liner 2. The grooved cam 91 includes a plurality of grooves 91a on one of disk surfaces such that the grooves 91a are inclined towards a radius direction of the disk surface. The grooved cam 91 is arranged at a position where the protrusions 72a of the first supporting members 72 are inserted into the grooves 91a. A third gear 91b, which is a spur gear, is fixed to the other disk surface of the grooved cam 91.

As illustrated in FIG. 2, the sixth drive unit 92 is a drive source that slides the guide portions 71 in the radius direction of the liner 2 and includes a motor etc. The sixth drive unit 92 is connected with the grooved cam 91 via a plurality of gears (i.e., via the third gear 91b, a fourth gear 91c, and a fifth gear 91d), and rotates the grooved cam 91 by a prescribed angle when operated.

As illustrated in FIG. 3, when the grooved cam 91 is rotated by the prescribed angle, the protrusions 72a inserted into the grooves 91a, i.e., the first supporting members 72 are slid. At this time, since the first supporting members 72 are supported by the second supporting members 73 slidably in the radius direction of the liner 2, the first supporting members 72 slide in the radius direction of the liner 2. Then, the guide portions 71 concurrently slide along with the first supporting members 72 in the radius direction of the liner 2.

The second guide member 60 of the helical winding unit 40 will now be described.

As illustrated in FIG. 2, the second guide member 60 includes a second rotation mechanism 61, a second slide mechanism 62, and a phase change mechanism 63. The second guide member 60 is slightly separated away from the first guide member 50 in the axial direction of the liner 2.

Guide units 70 of the second guide member 60 are attached to a second supporting ring 64. The second supporting ring 64 has the shape of a disk and includes a penetration hole at its central portion through which the liner 2 passes at the time of helical winding operation. The second supporting ring 64 is supported by a second fixing frame 65 such that the second supporting ring 64 can rotate about the axis of the liner 2.

By alternately arranging each of the leading end portions 71b of the guide portions 71 of the first guide member 50 and each of the leading end portions 71b of the guide portions 71 of the second guide member 60, i.e., by having different phases around the axis of the liner 2 between the guide portions 71 of the first guide member 50 and the guide portions 71 of the second guide member 60, each of the leading end portions 71b of the guide portions 71 of the second guide member 60 is disposed between each of the leading end portions 71b of the guide portions 71 of the first guide member 50 (FIGS. 6A-6C).

The second rotation mechanism 61 rotates the guide portions 71 of the second guide member 60 about their respective axes, and includes a seventh drive unit 66. The seventh drive unit 66 is a drive source that rotates the guide portions 71 of the second guide member 60 and includes a motor etc. Rotation of the motor of the seventh drive unit 66 is transmitted to the guide portions 71 via a face gear 81 of the second guide member 60 when the seventh drive unit 66 is operated, and thus the guide portions 71 of the second guide member 60 are concurrently rotated about their respective axes.

The second slide mechanism 62 slides the guide portions 71 of the second guide member 60 in the radius direction of the liner 2 and includes an eighth drive unit 67. The eighth drive unit 67 is a drive source that slides the guide portions 71 of the second guide member 60 in the radius direction of the liner 2 and includes a motor etc. When the eighth drive unit 67 is operated, rotation of the motor of the eight drive unit 67 is transmitted to the guide portions 71 via a grooved cam 91 etc. of the second guide member 60, and thus the guide portions 71 of the second guide member 60 concurrently slide in the radius direction of the liner 2.

The phase change mechanism 63 changes phases of the guide portions 71 of the second guide member 60 around the axis of the liner 2 and includes a worm gear 68 and a ninth drive unit. The worm gear 68 is connected with the second supporting ring 64 via a plurality of gears (a sixth gear 68a and a seventh gear 68b).

The ninth drive unit is a drive source that changes the phases of the guide portions 71 of the second guide member 60 around the axis of the liner 2 and includes a motor etc. The ninth drive unit is connected with the worm gear 68, and the second supporting ring 64 rotates about the axis of the liner 2 by a prescribed angle when the ninth drive unit is operated. Then, the guide portions 71 of the second guide member 60 are rotated about the axis of the liner 2 along with the second supporting ring 64. Thus, the phases of the guide portions 71 of the second guide member 60 change around the axis of the liner 2.

Each of the fifth, sixth, seventh, and eighth drive units 82, 92, 66, and 67 is connected with a control unit and individually controlled to operate/stop when a signal is transmitted from the control unit. The control unit includes a Central Processing Unit (CPU), a Read Only Memory (ROM), a Random Access Memory (RAM), and a Hard Disk Drive (HDD) or the like, which are mutually connected via a bus. The control unit stores various control programs and can develop these programs to perform prescribed calculations in accordance with the programs.

A displacement (positional change) of the guide portions 71 at the time of helical winding operation by the helical winding unit 40 will now be described.

Assume that the second fiber bundles 45a are wound around the liner 2 from the first cylindrical portion 2a, the hemisphere portion 2b, and to the second cylindrical portion 2c in this order. FIG. 6A illustrates the leading end portions 71b of the guide portions 71 viewed from the direction of arrow A of FIG. 5A. FIG. 6C illustrates the leading end portions 71b of the guide portions 71 viewed from the direction of arrow A of FIG. 5B. The arrows of FIGS. 6A-6C correspond to the axial direction of the liner 2.

Figure 4A:
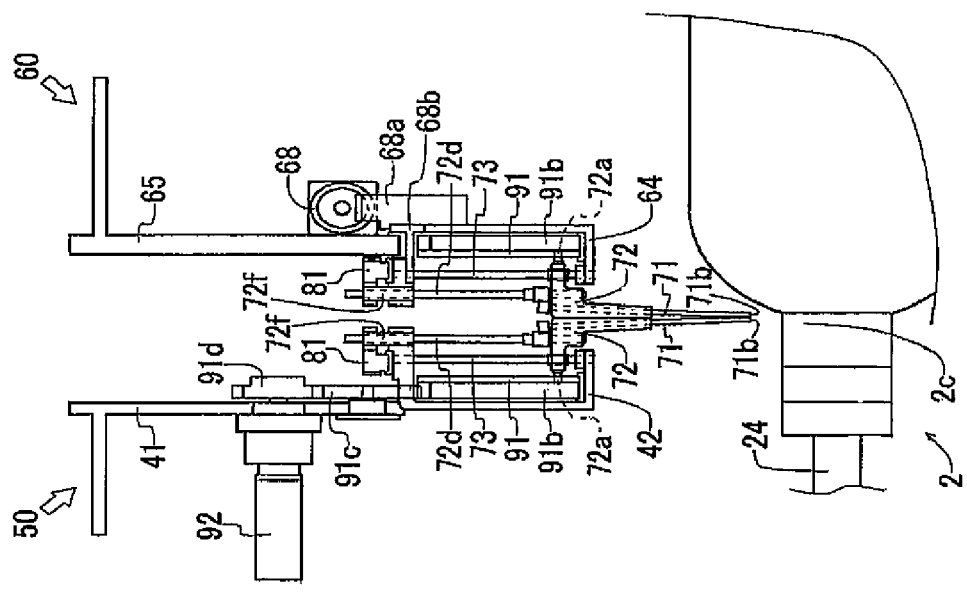
FIGS. 4A and 4B are elevation views of the first and second guide members according to an embodiment of the present invention.
Figure 5A:
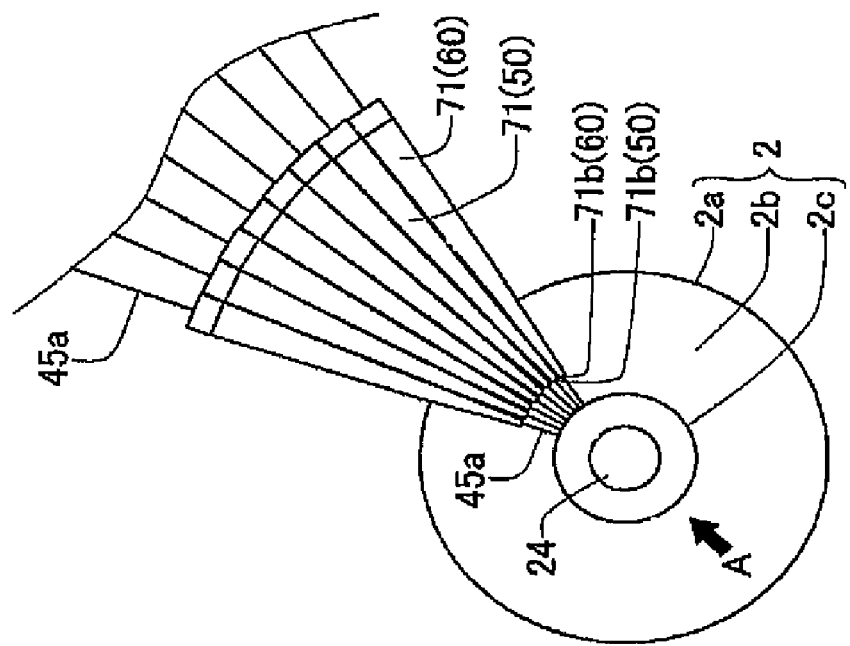
FIGS. 5A and 5B are side views of guide portions of the first and second guide members and liners according to an embodiment of the present invention.

As illustrated in FIGS. 4A and 5A, when the second fiber bundles 45a are wound around the first cylindrical portion 2a of the liner 2, the leading end portions 71b of the guide portions 71 of the first and second guide members 50, 60 are arranged such that the width direction of the leading end portions 71b are substantially perpendicular to the axis of the liner 2. As illustrated in FIG. 6A, each of the leading end portions 71b of the guide portions 71 of the first guide member 50 and each of the leading end portions 71b of the guide portions 71 of the second guide member 60 are alternately aligned.

A distance X is maintained from each of the leading end portions 71b of the guide portions 71 of the first and second guide units 50, 60 to a circumferential surface of the first cylindrical portion 2a (FIG. 5A). The distance X is the most appropriate distance from each of the leading end portions 71b of the guide portions 71 to the circumferential surface of the first cylindrical portion 2a and is pre-set by experiment etc. Moreover, with the distance X, the tension of the second fiber bundles 45a hardly fluctuates at the time of winding the second fiber bundles 45a, and the second fiber bundles 45a can be evenly wound around the liner 2.

When the second bundles 45a are wound around the hemisphere portion 2b of the liner 2, the control unit transmits a signal to the sixth and eighth drive units 92, 67 to slide the guide portions 71 of the first and second guide members 50, 60 towards the liner 2, and thus the distance X from each of the leading end portions 71b of the guide portions 71 of the first and second guide members 50, 60 to the circumferential surface of the first cylindrical portion 2a can be maintained.

As illustrated in FIG. 6B, the control unit transmits a signal to the fifth and seventh drive units 82, 66 to rotate the guide portions 71 of the first and second guide members 50, 60 about their respective axes. The rotation direction is not particularly limited and may be properly set as long as the guide portions 71 approach the liner 2 in such a state that the phase of each of the guide portions 71 around the axis is kept as illustrated in FIG. 6A.

The control unit transmits a signal to the ninth drive unit to rotate the guide portions 71 of the second guide member 60 about the axis of the liner 2, and thus maintains the arrangement in which each of the leading end portions 71b of the guide portions 71 of the first guide member 50 and each of the leading end portions 71b of the guide portions 71 of the second guide member 60 are alternately aligned. Accordingly, the leading end portions 71b can be prevented from being collided with each other.

Figure 4B:
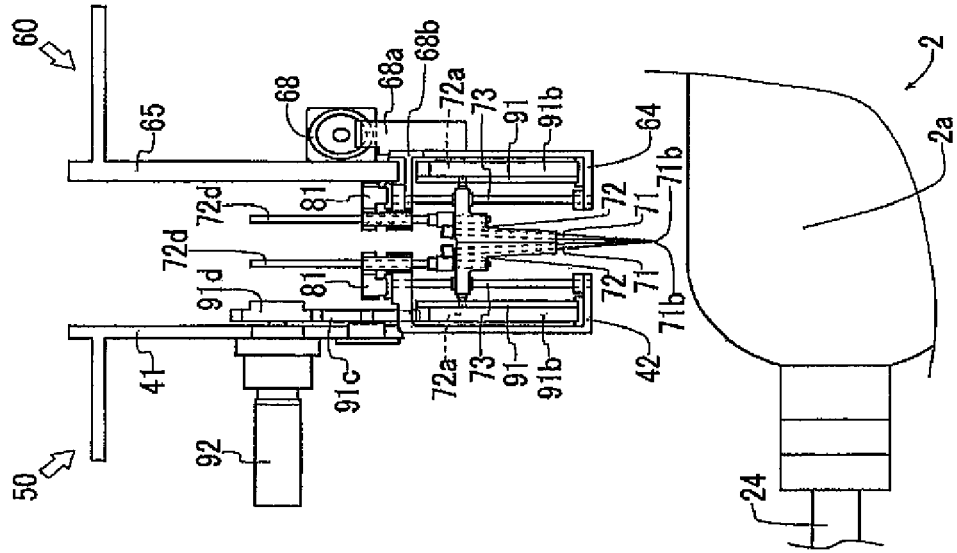
Figure 5B:
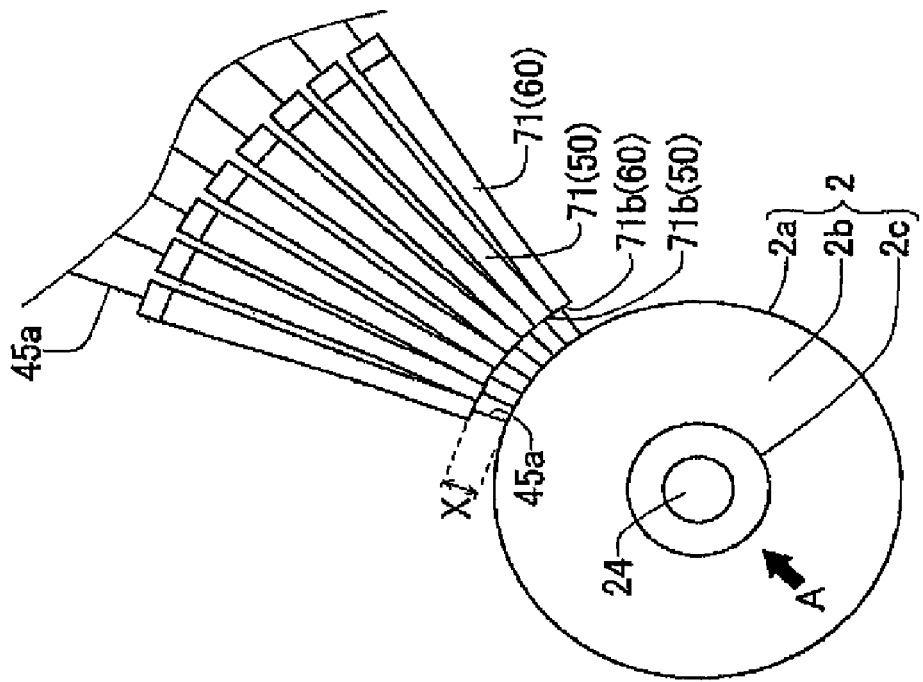

As illustrated in FIGS. 4B, 5B, and 6C, when each of the second fiber bundles 45a is wound around the second cylindrical portion 2c of the liner 2, each of the leading end portions 71b of the guide portions 71 of the first and second guide members 50, 60 is arranged to overlap with each other in the thickness direction. In this arrangement in which each of the leading end portions 71b overlap with each other in the thickness direction, the thickness direction of the leading end portions 71b of the guide portions 71 is set to be substantially perpendicular to the axis of the liner 2, and the adjacent leading end portions 71b make contact with each other. Each of the leading end portions 71b of the guide portions 71 of the first guide member 50 and each of the leading end portions 71b of the guide portions 71 of the second guide member 60 are alternately aligned.

In other words, the control unit performs the control of processes (1) through (3) as described below while the portion to which the second fiber bundles 45a are guided changes from the hemisphere portion 2b to the second cylindrical portion 2c of the liner 2, and arranges each of the leading end portions 71b of the guide portions 71 of the first guide member 50 and each of the leading end portions 71b of the guide portions 71 of the second guide member 60 to overlap in the thickness direction.

(1) The control unit transmits a signal to the ninth drive unit to maintain the state in which each of the leading end portions 71b of the guide portions 71 of the first guide member 50 and each of the leading end portions 71b of the guide portions 71 of the second guide member 60 are alternately aligned.

(2) The control unit transmits a signal to the fifth and seventh drive units 82, 66 to rotate the guide portions 71 until the thickness direction of each of the leading end portions 71b of the first and second guide members 50, 60 comes to the position where the thickness direction is substantially perpendicular to the axis of the liner 2.

(3) The control unit transmits a signal to the sixth and eighth drive units 92, 67 to bring the guide portions 71 towards the liner 2 to the position where each of the adjacent leading end portions 71b of the guide portions 71 of the first and second guide members 50, 60 make contact with each other.

With the above arrangement, compared with the case in which the guide portions 71 are brought close to the liner 2 without being rotated about their respective axes from the state in which the second fiber bundles 45a are wound around the first cylindrical portion 2a of the liner 2 (FIG. 6A), the guide portions 71 can be brought closer to the liner 2, and a range of movement of the guide portions 71 increases. Accordingly, the distance X from each of the leading end portions 71b of the guide portions 71 to the circumferential surface of the second cylindrical portion 2c of the liner 2 can be easily maintained.

As described above, the filament winding apparatus 1 includes a plurality of guide portions 71, each of which is a tubular member having the guide hole penetrated from the base end portion 71a to the leading end portion 71b, has the size T in the thickness direction of the leading end portion 71b that is smaller than the size W in the width direction, and guides the second fiber bundle 45a from the side of the base end portion 71a of the guide hole to the side of the leading end portion 71b to guide the second fiber bundle 45a to the liner 2. Moreover, the filament winding apparatus 1 rotates the guide portions 71 about their respective axes and slides the guide portions 71 in the radius direction of the liner 2 to bring them close to the liner 2.

With the above configuration, the guide portions 71 can be brought close to the liner 2 until the leading end portions 71b of the guide portions 71 overlap in the thickness direction. As a result, the variation of the distance from the liner 2 to each of the guide portions 71 can be reduced, and fluctuations in the winding operation can also be reduced.

The filament winding apparatus 1 further includes: the plurality of guide units 70 each having the first supporting member 72 that supports the guide portion 71 such that the guide portion 71 can rotate about its axis and the second supporting member 73 that supports the first supporting member 72 such that the first supporting member 72 can slide in the radius direction of the liner 2; the first rotation mechanism 80 (the second rotation mechanism 61) that rotates the guide portions 71 about their respective axes; and the first slide mechanism 90 (the second slide mechanism 62) that slides the first supporting members 72 in the radius direction of the liner 2.

With the above configuration, by rotating the guide portions 71 about their respective axes by the first rotation mechanism 80, and by sliding the first supporting members 72, i.e., the guide portions 71 in the radius direction of the liner 2 by the first slide mechanism 90, the guide portions 71 can be brought close to the liner 2 until the leading end portions 71*b* of the guide portions 71 overlap in the thickness direction. As a result, the variation of the distance from the liner 2 to each of the guide portions 71 can be further reduced, and the fluctuations in the winding operation can also be reduced.

The filament winding apparatus 1 includes the phase change mechanism 63 that divides the guide portions 71 into a plurality of groups, i.e., into the group of the guide portions 71 of the first guide member 50 and the group of the guide portions 71 of the second guide member 60 and changes the phases of the guide portions 71 of the second guide member 60 around the axis of the liner 2.

With the above configuration, by bringing the guide portions 71 close to the liner 2 while overlapping the leading end portions 71*b* of the guide portions 71 in the thickness direction, and by changing the phases of the guide portions 71 of the second guide member 60 around the axis of the liner 2 by the phase change mechanism 63, the guide portions 71 of the first and second guide members 50, 60 can be brought close to the liner 2 until the guide portions 71 of the first and second guide members 50, 60 overlap in the thickness direction, and the second fiber bundles 45*a* guided from the guide portions 71 of the first and second guide members 50, 60 can be wound around the liner 2. Accordingly, variation of the distance from the liner 2 to each of the guide portions 71 of the first and second guide members 50, 60 can be reduced, fluctuations in the winding operation can be reduced, and a greater number of second fiber bundles 45*a* can be wound around the liner 2.

The first supporting members 72 slide with respect to the second supporting members 73 such that the distance from the leading end portions 71*b* of the guide portions 71 to the liner 2 can be maintained constant.

With the above configuration, since the distance from the leading end portions 71*b* of the guide portions 71 to the liner 2 can be maintained, the second fiber bundles 45*a* can be wound around the liner 2 while maintaining the tension of the second fiber bundles 45*a* constant, and the fluctuations in the winding operation can be reduced.

While the present invention has been described with respect to embodiments thereof, it will be apparent to those skilled in the art that the disclosed invention may be modified in numerous ways and may assume many embodiments other than those specifically set out and described above. Accordingly, the appended claims cover all modifications that fall within the true spirit and scope of the present invention.

What is claimed is:

1. A filament winding apparatus that winds fiber bundles around a liner, the apparatus comprising a plurality of guide portions, wherein
    each of the guide portions is a tubular member having a guide hole that is penetrated from a base end portion to a leading end portion,
    the leading end portion has a smaller size in a thickness direction than in a width direction,
    each of the guide portions guides the fiber bundle to the liner by passing the fiber bundle from a side of the base end portion to a side of the leading end portion of the guide hole, and
    the guide portions are brought close to the liner by rotating each of the guide portions about an axis of the guide portion and by moving the guide portions in a radius direction of the liner.

2. The filament winding apparatus according to claim 1, further comprising:
    a first supporting member that supports the guide portion such that the guide portion can rotate about the axis of the guide portion;
    a second supporting member that supports the first supporting member such that the first supporting member can slide in the radius direction of the liner;
    a rotation mechanism that rotates the guide portion about the axis of the guide portion; and
    a slide mechanism that slides the first supporting member in the radius direction of the liner.

3. The filament winding apparatus according to claim 2, wherein the first supporting member slides with respect to the second supporting member such that a distance from the leading end portion of the guide portion to the liner is maintained constant.

4. The filament winding apparatus according to claim 2, wherein the slide mechanism comprises a grooved cam having a plurality of grooves that is arranged at a position where protrusions of the first supporting member are inserted into the grooves.

5. The filament winding apparatus according to claim 4, wherein the grooved cam has a shape of a disk and includes a penetration hole at its central portion through which the liner passes.

6. The filament winding apparatus according to claim 1, further comprising a phase change mechanism that divides the guide portions into a plurality of groups and changes phases around the axis of the liner with respect to each of the plurality of groups.

7. The filament winding apparatus according to claim 1, wherein each of the guide portions has a taper shape tapered off from a side of the base end portion to a side of the leading end portion.

8. The filament winding apparatus according to claim 1, wherein the leading end portion has a flat oval shape.

9. A method for winding a fiber bundle around a liner, comprising:
    guiding the fiber bundle to the liner by passing the fiber bundle from a base end portion side of tubular guide portions to a leading end portion side of the tubular guide portions;
    bringing the tubular guide portions close to the liner by rotating the tubular guide portions about their axes and by moving the tubular guide portions in a radius direction of the liner.

10. The method according to claim 9, further comprising:
    dividing the guide portions into a plurality of groups; and
    changing phases around the axis of the liner with respect to each of the plurality of groups.

* * * * *